United States Patent [19]
Clark

[11] Patent Number: 5,899,604
[45] Date of Patent: May 4, 1999

[54] EXTENDING THE DYNAMIC RANGE OF SINGLE-BIT, ELECTROGRAPHIC PRINTERS THROUGH MULTI-PASS PRINTING

[76] Inventor: Lloyd Douglas Clark, 15 Conrad St., San Francisco, Calif. 94131

[21] Appl. No.: 08/957,882

[22] Filed: Oct. 27, 1997

[51] Int. Cl.[6] .................................................. G03G 15/01
[52] U.S. Cl. ........................ 399/223; 358/501; 358/515; 358/540
[58] Field of Search .................... 358/515, 516, 358/518, 519, 520, 521, 522, 523, 540, 501, 502; 399/223

[56] References Cited

U.S. PATENT DOCUMENTS

| | | | |
|---|---|---|---|
| 4,631,548 | 12/1986 | Milbrandt | 346/1.1 |
| 4,965,613 | 10/1990 | Morris et al. | 364/25 |
| 5,172,224 | 12/1992 | Collette et al. | 358/80 |
| 5,487,020 | 1/1996 | Long | 364/571.01 |
| 5,668,890 | 9/1997 | Winkelman | 382/167 |
| 5,793,501 | 8/1998 | Murakami | 358/520 |
| 5,802,216 | 9/1998 | Hayashi et al. | 382/270 |

*Primary Examiner*—Richard Moses
*Assistant Examiner*—Shival Virmani

[57] ABSTRACT

A computer (500) with a graphics program, an eight-plane raster image processor program, an eight-plane print-sending program, and a contrast-control program is connected to a single-bit, four-pass, electrographic printer (430). One or more of the primary colors is individually divided into multiple layers (100', 200 . . . ), with each layer having an independently selectable contrast setting (300—330). The printer (430') is now capable of printing images with an improved color gamut and dynamic range.

18 Claims, 5 Drawing Sheets

EXTENDING THE DYNAMIC RANGE OF SINGLE-BIT, ELECTROGRAPHIC PRINTERS THROUGH MULTI-PASS PRINTING

BACKGROUND

1. Field of Invention

This invention relates to electrographic printing. Particularly, it teaches a method for improving gradations within the optical density range achievable by single-bit electrostatic printers.

2. Prior Art—Single-Bit Electrographic Printing Employing Four Primary Colors—FIG. 1

Electrographic printers generally apply an electrical charge pattern, or image, to a surface. This charge image is initially invisible. It is "developed" or made visible through the application of "toner." Toner consists of a collection of minute, typically micron-sized, electrically charged particles. The electrical charge on these particles is opposite to that in the charge pattern. Therefore the particles adhere to the charge pattern, but not to uncharged areas, rendering the charge image visible. Toner is available in a dry, powder form or a liquid form.

A typical electrographic printer in widespread use today is the 8900-Series electrostatic printer manufactured and sold by Xerox ColorgrafX Systems, Inc., 5853 Rue Ferrari, San Jose, Calif. 95138, U.S.A. These printers deposit a latent (undeveloped) electrical charge image on electrographic paper or other medium which is later "developed" using liquid toners, also called "inks." The final graphic print comprises an assemblage of binary dots, i.e. dots which are either present or absent. Another term used to describe this type of printing is "single-bit printing" since a single binary bit is either a one (dot present) or a zero (dot absent). In color images, the dots are printed successively in four primary color "planes." These planes are superposed as shown in FIG. 1 to form a single image. The black portion, plane, or layer 100 of the image, comprising dots 110, is generally laid down first. It is typically followed by a cyan layer 120, a magenta layer 130, and a yellow layer 140. Gray scale capability has been demonstrated but has generally eluded practical application. Images printed in four passes achieve the appearance of gray scale by varying the spacing among the dots using "dither patterns," in well-known fashion. In four-pass printing, the full dynamic range of each primary color is contained in its respective plane. The resulting printed image is excessively high in contrast. Shadows reproduce well. Faithful reproduction of mid-tones and highlights is not possible because of the limited dynamic range which can be accomplished using only dither patterns. Also, the number of colors which can be printed is limited since these colors are derived from dithered patterns of only four primary colors.

Prior Art—Single-Bit Electrographic Printing Employing Seven or Eight Colors—FIG. 2

An attempt has been made to improve the quality of single-bit printers—both electrostatic and inkjet—by printing seven or eight successive color passes instead of the previous four. A black pass 100' (FIG. 2) is typically printed first. In some cases, a second gray pass 200 is then printed. A true cyan pass 120' follows. Then a lighter blue or cyan pass 210 is printed. Next, a true magenta pass 130' is printed. This is followed by a lighter, magenta-like color pass 220. Finally a normal yellow pass 140' and a lighter, yellow-like pass 230 are printed. This seven-pass or eight-pass printing results in substantially improved images. However it also requires three or four extra ink colors, and the apparatus to apply them.

Prior Art—Single-Bit Electrostatic Printers—FIGS. 3 and 4

Single-bit electrostatic printers of the type made by Xerox ColorgrafX Systems employ a "contrast" adjustment. From the printer's controls it is possible to set the contrast (or saturation) of each color plane to values which lie between 0 and 99. When the contrast setting is "0" (FIG. 3), the dots 300 in a plane are absent. When the setting is 10, dots 310 are very faint. When the setting is 100, dots 330 are fully saturated. Normal settings lie in the 20 to 80 range. Dot 320 is representative of a contrast setting of 50. The contrast setting is applied equally to all dots in each color plane. Each color plane can have a different contrast setting. It is possible to set all contrast settings to greater or lesser levels in order to obtain lighter or darker prints. However these settings must be properly matched with each other to ensure proper color rendition of the final image. For example, if the cyan contrast setting is 100 and the yellow contrast setting is 0, it will not be possible to print any shade of green—which is the normal result of mixing of these two primary colors. Normally the contrast settings are adjusted so that cyan, magenta, and yellow contribute equal reflective optical densities in a three-color black image. Note that although the contrast control can be used to lighten or darken dots in a given plane, these dots are still "binary" in nature—they are either present or absent.

A prior-art, single-bit printing system is shown schematically in FIG. 4. A computer 400 contains a graphics program, a Raster Image Processor (RIP) program (described infra), and a print-sending program. In some systems, more than one computer is used. A first computer may contain the graphics program. A second may contain the RIP, and a third may contain the print-sending program. Files are easily transferred from one computer to another. Distributing the computing work can result in a saving of time. A typical print-sending program is manufactured and sold by Visual Edge Technology, Inc., 306 Potrero Ave., Sunnyvale, Calif. 94086-4113 U.S.A. The graphics program causes the image of interest 410 to be shown on monitor 420). The data which comprise image 410 are held in the computer's memory for use by the RIP program. On command, the RIP program converts the image from Red-Green-Blue (RGB) format to Cyan-Magenta-Yellow-blacK (CMYK) format and organizes it into color planes, described infra. The print sending program then sends the output of the RIP program to the printer, one color plane at a time in well-known fashion. Printer 430 then prints image 440. The density (or saturation) of color planes of image 440 are controlled by contrast controls 450. Images printed by single-bit printers using only four color planes are excessively high in contrast. Shadows print reliably but highlights and mid-tones do not reproduce faithfully. This is because the full dynamic range of a printed image must be accomplished using dither patterns. Instead of being printed with light-colored dots, light areas in an image using prior art technology comprise dark dots which are widely spaced. This is objectionable in most images.

Prior Art—Raster Image Processing

A color image which is to be printed is normally viewed on a computer screen which emits light. This image comprises an admixture of red, blue, and green dots of varying intensities. Since it is an admixture of colors, this is said to be an "additive, RGB" color image. Images printed on paper or other media generally comprise layers of pigments or dyes. These pigments or dyes overlay one-another and absorb, rather than emit, light. The paper image is thus said to be a "subtractive, CMYK" color image. In the present case, electrographic printers print the image in raster fashion. Each color plane image is printed in raster lines of one color at a time, starting it one end of the image and finishing at the other end, in well-known fashion. The second color is laid over the first, the third over the first and second, and so on.

Computer software, commonly called a RIP, is required to convert the image from an RGB image to a CMYK image. RIP software is manufactured and sold by Visual Edge Technology, Inc., 306 Potrero Ave., Sunnyvale, Calif. 94086-4113 U.S.A. Color matching, re-rasterizing to the proper dot density, and dithering to achieve light-to-dark graduations are all functions of the RIP. In a four-color printing process such as that shown in FIG. 1, the full dynamic range of the RGB image is converted to an equivalent dynamic range of the final CMYK image. The four color planes are then printed sequentially, as described supra.

This prior-art technology can be expanded to include eight colors, eight contrast controls, and eight ink applicators (not shown). In an eight-color printing process such as that in FIG. 2, the full dynamic range of the RGB image is converted to an equivalent dynamic range of the final cyan, cyan-like, magenta, magenta-like, yellow, yellow-like, black, and black-like (or gray) colors. The eight color planes are then printed sequentially, as described supra. The prior-ail, eight-color printing process requires four extra colors of ink and the apparatus to apply them to the final image surface. This is costly and requires extra quality control steps to ensure the ink colors are correct.

OBJECTS AND ADVANTAGES

Accordingly, several objects and advantages of the present invention are to provide an improved electrostatic printer and to provide improved electrographic images through the use of multi-pass printing while using only four primary color inks. Another object is to eliminate the need for an extra four, lighter color primary inks. Another object is to print improved images on printers which are designed for printing only four primary colors, thus saving equipment costs.

Additional objects and advantages will become apparent from a consideration of the drawings and ensuing description thereof.

SUMMARY

In accordance with the present invention, an electrostatic printing method uses only four primary colors to produce color prints which are equal or nearly equal in quality to those produced using eight primary colors. Standard, four-color printers are used in combination with modified raster image processing software and an external contrast-controlling computer program. The modified raster image processing software divides the image data for each color into at least two printing layers, instead of one. Two layers of each color, each at a different contrast setting, are then printed. The result is a print with an improved color gamut containing finer gradations between the lightest and darkest portions of an image.

DRAWING REFERENCE NUMERALS

Figure 1:
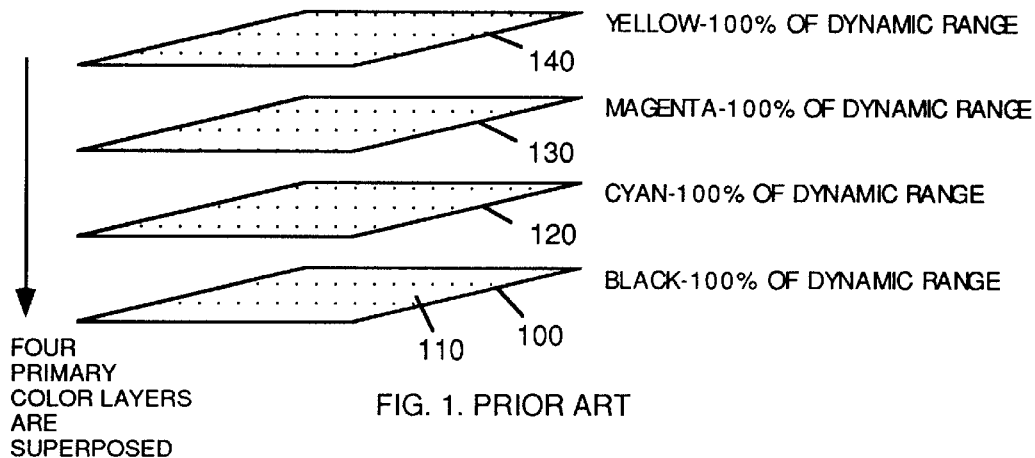
FIG. 1 is a schematic diagram of prior-art, four-primary-color, single-bit printing layers.
Figure 2:
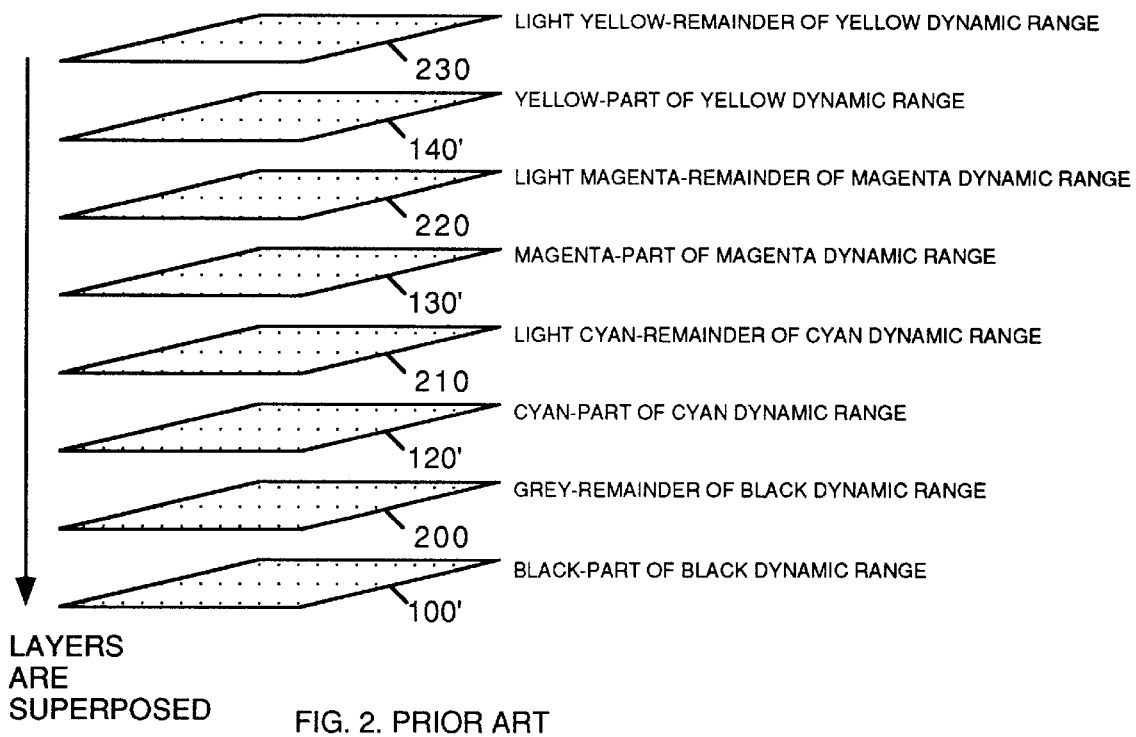
FIG. 2 is a schematic diagram of prior-art, eight-primary-color, single-bit printing layers.
Figure 3:
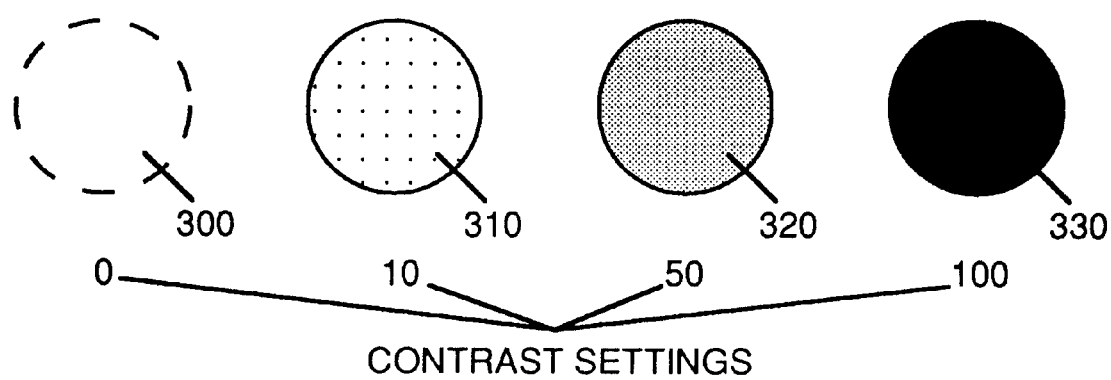
FIG. 3, prior art, is a diagram showing dot densities printed at different printer contrast settings.

FIG. 1—Prior-art
   100 Black image plane
   110 Black dots
   120 Cyan image plane
   130 Magenta image plane
   140 Yellow image plane FIG. 2—Prior-art
   100' Black part of black dynamic range
   200 Gray remainder of black dynamic range
   120° Cyan part of cyan dynamic range
   210 Light cyan remainder of cyan dynamic range
   130' Magenta part of magenta dynamic range
   220 Light magenta remainder of magenta dynamic range
   140' Yellow part of yellow dynamic range
   230 Light yellow remainder of yellow dynamic range FIG. 3—Prior-art
   300 Dot printed with contrast setting of 0
   310 Dot printed with contrast setting of 10
   320 Dot printed with contrast setting of 50
   330 Dot printed with contrast setting of 100

Figure 4:
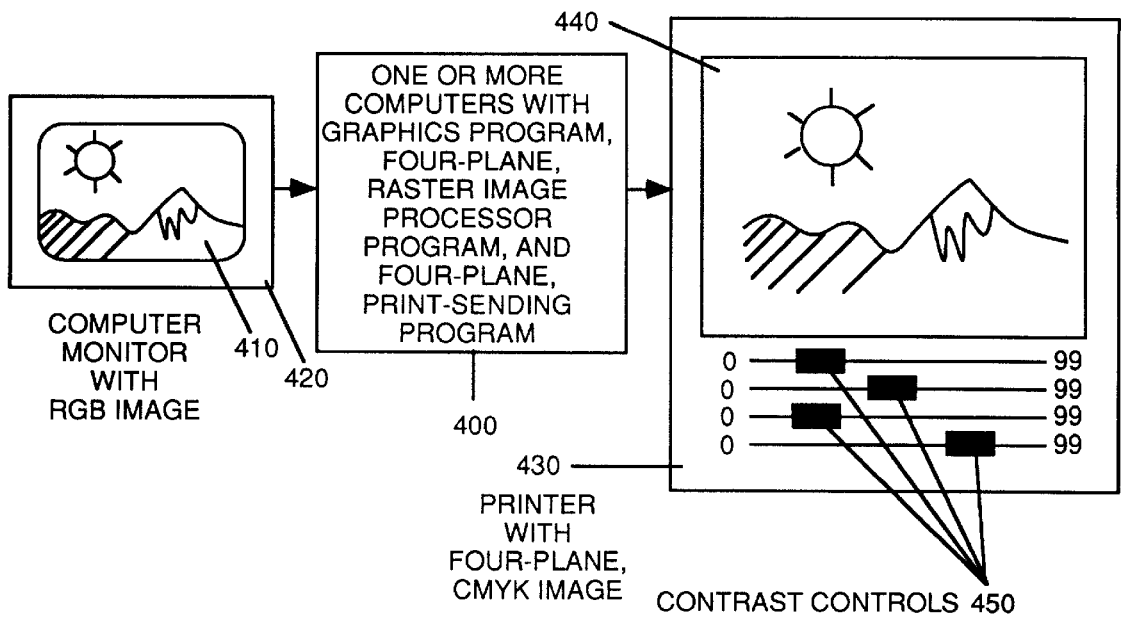
FIG. 4 is a schematic diagram showing apparatus comprising the prior-art, four-color printing method.
Figure 5:
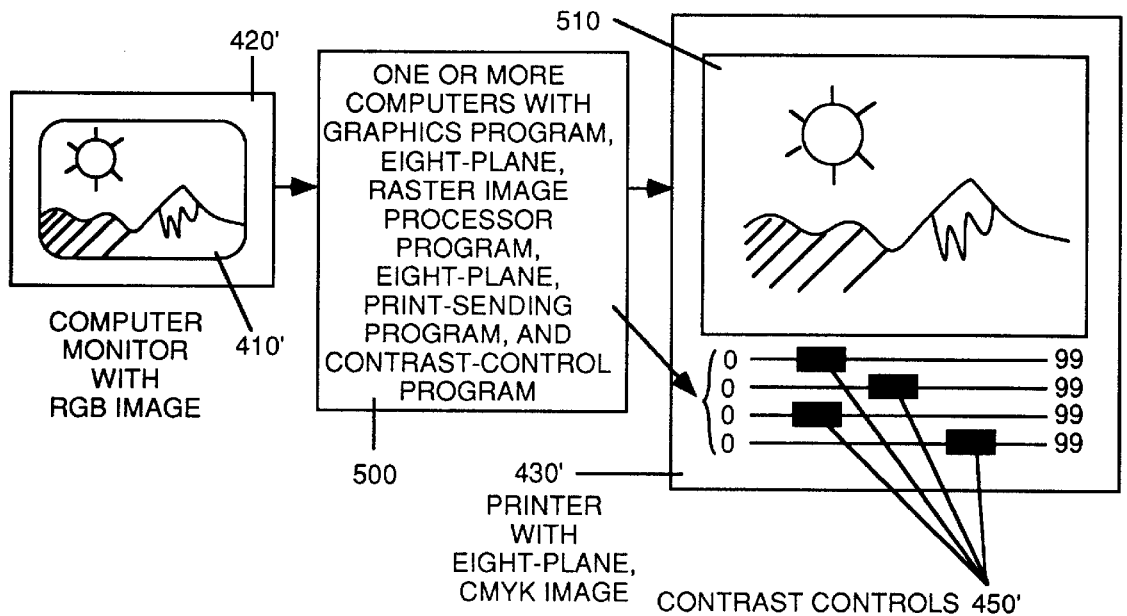
FIG. 5 is a schematic diagram showing eight-pass printing according to the present invention.
Figure 6:
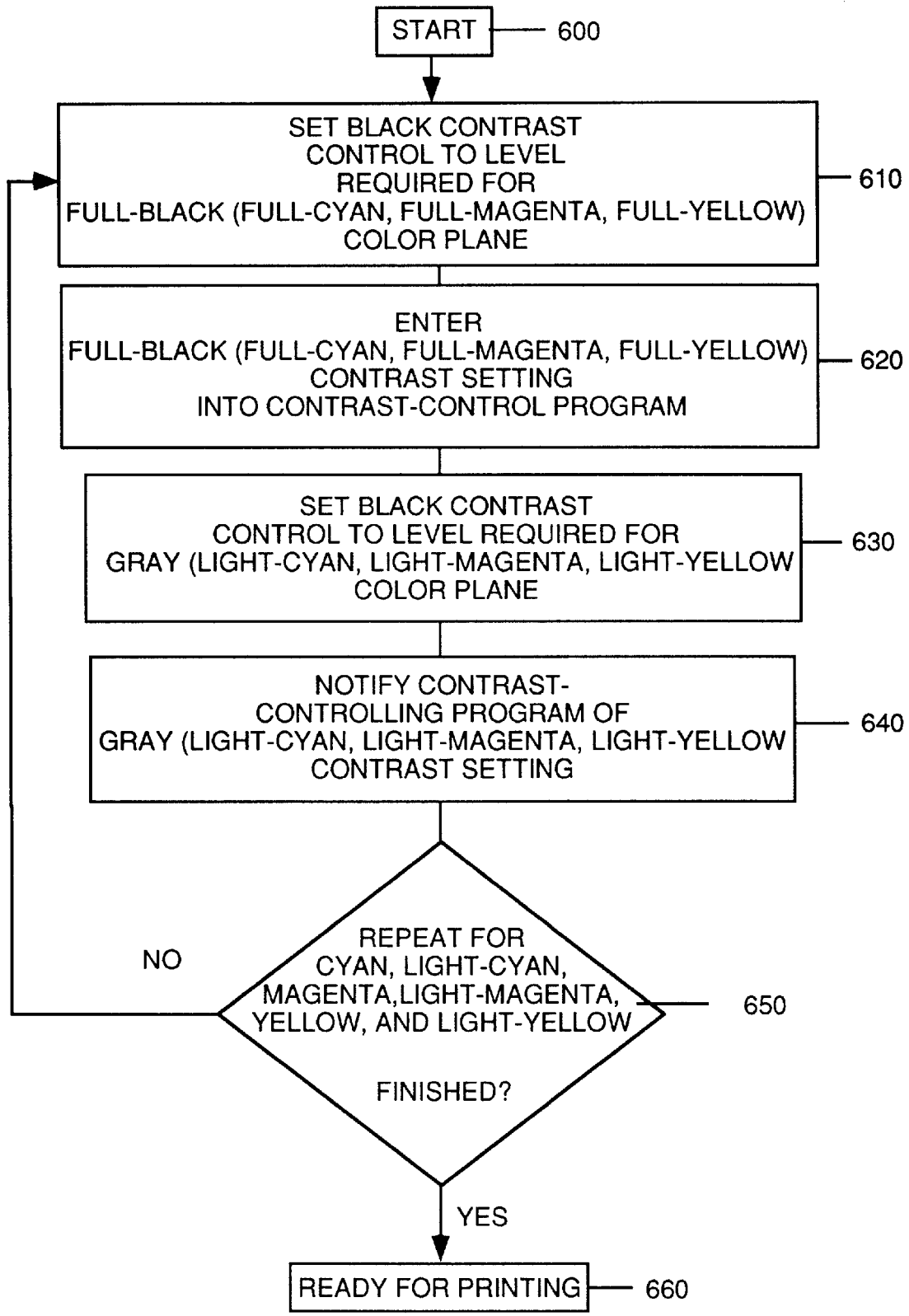
FIG. 6 is a block diagram showing the steps required to set up the contrast-controlling program prior to printing.
Figure 7:
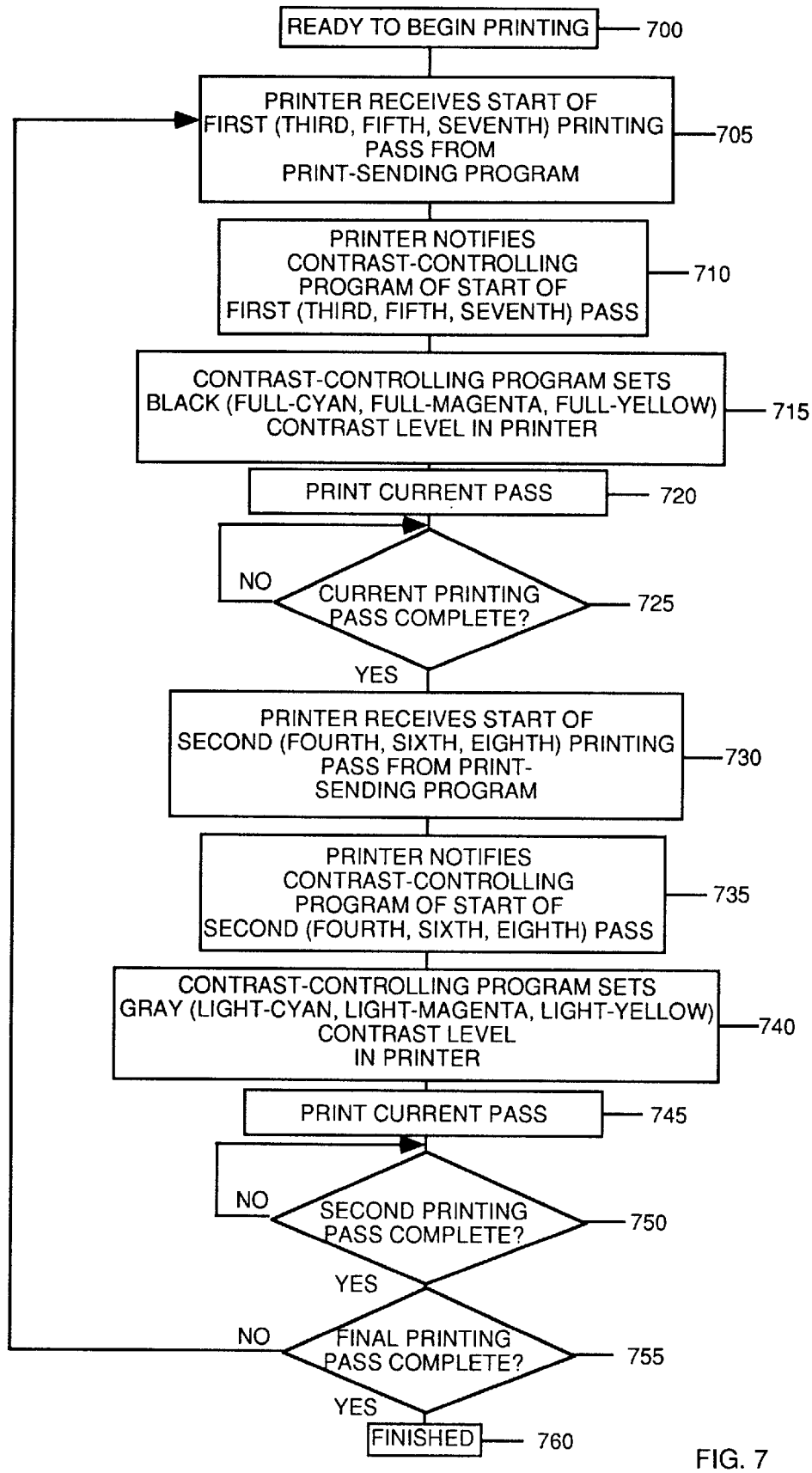
FIG. 7 is a block diagram showing the steps required to print an image according to the present invention.

FIG. 4—Prior-art
   400 Computer with prior-art programs
   410 RGB image
   420 Monitor
   430 Printer
   440 Printed image
   450 Contrast controls FIG. 5
   500 Computer with expanded programs
   510 Improved image
   410' RGB image
   420' Monitor
   430' Printer
   450' Contrast controls FIG. 6—Block Diagram FIG. 7—Block Diagram

Eight-Pass Printing Using a Contrast-Control Program—FIG. 5

The printing system of the invention is shown in FIG. 5 and comprises a computer monitor 420', a computer 500, and a printer 430'. As described supra, computer 500 may comprise a plurality of computers, each dedicated to a specific task. A printer contrast-control program, an eight-plane Raster Image Processor (RIP), and an eight-plane print-sending program have been implemented in computer 500. The eight-plane RIP and eight-plane print-sending programs are straightforward expansions of existing software programs sold by Visual Edge Technology (mentioned supra) and others. These expansions can be straightforwardly accomplished by those skilled in the art of writing programs of this kind and will not be discussed further herein.

The printer contrast-control program is manufactured and sold under the mark "Paedia-Pro III", by Paedia Corporation, 499 Carolina Street, San Francisco, Calif. 94107-2303, U.S.A. This program normally interfaces to the printer via the computer's serial port and the printer's serial control port. In addition to numerous other functions, the Paedia-Pro III program has the ability to detect which color pass is being printed and to set the corresponding contrast control for that color printing pass. Printer 430' contains four primary color inks. According to the printing pass, these colors can be printed with lower or higher contrast settings, producing lighter or darker images. Normally, the print-sending program sends the color planes to be printed in a particular order, typically black, gray, normal cyan, light cyan, normal magenta, light magenta, normal yellow, and light yellow. Image 510 is an improved, eight-plane, four-primary-color image.

Contrast-Control Program Setup—FIG. 6

The RIP manufacturer normally specifies the reflectance optical density settings expected for each of the eight color planes to be printed: black, gray, cyan, light cyan, and so forth. Using an optical densitometer or colorimeter (not shown), the operator determines the value of contrast setting which produces the desired reflectance optical density of each color pass to be printed. These values are stored in the contrast-control program prior to printing. This process is shown schematically in the logic block diagram of FIG. 6, which proceeds from top to bottom as follows:

After starting (block 600), the operator manually sets the black contrast control to a setting, between 0 and 99, specified for the black color plane (block 610). When this setting is confirmed using an optical densitometer, it is entered into the contrast-controlling program (block 620). Next, the operator manually sets the black contrast control to a setting, between 0 and 99, specified for the gray color plane (block 630). When this setting is confirmed using an optical densitometer, it is entered into the contrast-controlling program (block 640). Upon reaching block 650, the operator returns to the instruction in block 610 and repeats the process for cyan and light-cyan. After cyan and light-cyan settings have been entered, the process is repeated for magenta and light-magenta, and finally yellow and light-yellow. When the last yellow setting has been entered into the contrast-controlling program, the contrast-controlling program is ready for printing (block 660).

Eight-Pass Printing with Preset Contrast Settings for Each Color Plane—FIG. 7

When the system is ready to begin printing, (block 700), the printer receives the start of the first color pass (block 705), typically black, from the print-sending program. The printer notifies the contrast-controlling program of the start of the first pass (block 710). The contrast-controlling program sets the black contrast level of the printer to the previously entered value for black (block 715). The associated contrast setting typically is "85." The printer prints the first pass (block 720). This contrast setting is maintained until the first printing pass is complete (block 725).

The printer next receives the start of the second color pass (block 730) from the print-sending program. The printer notifies the contrast-controlling program of the start of the second pass (block 735). The contrast-controlling program sets the black contrast level of the printer to the previously entered value for gray (block 740). The associated contrast setting typically is "20." The printer prints the second pass (block 745). This contrast setting is maintained until the second printing pass is complete (block 750).

If the printing job is not complete (block 755), the work flow branches back to block 705 and the printer receives the start of the third printing pass. The third and fourth printing passes (cyan and light-cyan) with their associated contrast settings are completed in the same manner.

The fifth and sixth printing passes, magenta and light-magenta respectively follow the cyan and light-cyan passes. Finally, the yellow and light-yellow passes are printed and the printing job is finished (block 760). Thus it can be seen that by extending the RIP and print-sending software to include more than four planes, and adding contrast-controlling software this system can use four-color electrographic printers to print images with a larger dynamic range than previously possible. Mid-tones and highlights are printed more faithfully than by prior art systems. Because of this, light-to-dark gradients appear smoother. The result is improved image quality.

Summary, Ramifications, and Scope

It is thus seen that the present system provides an improved electrostatic printing system. It provides a novel way to print eight, independent color layers using a four-pass printer, an expanded RIP, expanded print-sending software, and contrast-control software. This method, its computer programs, and apparatus provide a new printing modality. This modality produces higher quality, eight-color-plane prints than formerly available by improving performance of four-color printers.

While the invention has been described with a specific system constituting the presently preferred embodiment, many ramifications and variations are possible within its scope.

Instead of eight colors, fewer colors can be used. For example, only a single layer of yellow can sometimes be used to achieve all the colors desired in the final print. Alternatively, more than eight colors cain be used. For example, color planes comprising three different contrast settings for cyan may be required to achieve a desired result.

Different sets of colors can be used.

The contrast-control, graphics, and RIP programs may be contained in the same computer, or in two or more computers.

The interface between the contrast-control program and the printer can be via the image channel interface (not shown), instead of the serial port.

Although the example given supra cites a printer manufactured by Xerox ColorgrafX Systems, the same principle can be applied to printers manufactured by others.

While the present system employs elements which are well known to those skilled in the separate arts of computer programming, printing, and ink management and control, it combines elements from these fields in a novel way which produces a new result not heretofore discovered.

Accordingly the scope of this invention should be determined, not by the embodiments illustrated, but by the appended claims and their legal equivalents.

I claim:

1. A system for printing multiple color layers of one or more primary colors, comprising:

a. first means for recording, storing, and processing image information, b. an electrographic printer with a plurality of adjustable contrast controls, c. second raster image processing means for receiving image information from said first means and separating said image information into image information representing a multiplicity of color layers, said multiplicity of color layers comprising more than a single layer for at least one color, d. third means for sending said image information representing said multiplicity of color layers to said printer, and e. fourth means arranged to receive information about said multiplicity of color layers and control said contrast controls on said printer in response to information about said color layers.

2. The system of claim 1 wherein said first means for recording, storing, and processing image information is a computer.

3. The system of claim 2 wherein said first means comprises a plurality of computers.

4. The system of claim 1 wherein said raster image processor means is a computer program.

5. The system of claim 1 wherein said print-sending means is a computer program.

6. The system of claim 1 wherein said contrast-control means is a computer program.

7. The system of claim 1 wherein said information about said color layers is supplied by said raster image processing means.

8. The system of claim 1 wherein said information about said color layers is supplied by said print-sending program.

9. The system of claim 1 wherein said multiplicity of color layers are a plurality of additive primary colors.

10. The system of claim 1 wherein said multiplicity of color layers are a plurality of subtractive primary colors.

11. A method for printing multiple color layers of one or more primary colors, comprising:
  a. recording, storing, and processing image information,
  b. providing an electrographic printer with a plurality of adjustable contrast controls, said printer being arranged to provide information about the color layer being printed,
  c. providing raster image processing means to separate said image information into information representing a multiplicity of color layers, said multiplicity of color layers comprising more than a single layer for at least one color,
  d. sending said information representing said multiplicity of color layers to said printer, and
  e. controlling said contrast controls in response to information about said color layers.

12. The method of claim 11 wherein said means for recording, storing, and processing image information is a computer.

13. The method of claim 11 wherein said raster image processor means is a computer program.

14. The method of claim 11 wherein said print-sending means is a computer program.

15. The method of claim 11 wherein said means for controlling said contrast controls is a computer program.

16. A system for printing multiple color layers of one or more primary colors, comprising:
  a. at least one computer for recording, storing, and processing image information,
  b. an electrographic printer with a plurality of adjustable contrast controls,
  c. a raster image processor for receiving image information from said computer and separating said image information into image information representing a multiplicity of color layers, said multiplicity of color layers comprising more than a single layer for at least one color,
  d. a print-sender for sending said image information representing said multiplicity of color layers to said printer, and
  e. a contrast control computer program for receiving information about said multiplicity of color layers and controlling said contrast controls on said printer in response to information about said color layers.

17. The system of claim 16 wherein said raster image processor is arranged to supply information about said color layers.

18. The system of claim 16 wherein said print-sending program supplies said information about said color layers.

* * * * *